(12) United States Patent
Tada et al.

(10) Patent No.: US 7,874,952 B2
(45) Date of Patent: Jan. 25, 2011

(54) POWER TRANSMISSION CHAIN AND POWER TRANSMISSION DEVICE

(75) Inventors: Seiji Tada, Kashiba (JP); Shigeo Kamamoto, Kashiwara (JP)

(73) Assignee: JTEKT Corporation, Osaka (JP)

(*) Notice: Subject to any disclaimer, the term of this patent is extended or adjusted under 35 U.S.C. 154(b) by 106 days.

(21) Appl. No.: 11/898,450

(22) Filed: Sep. 12, 2007

(65) Prior Publication Data

US 2008/0070744 A1 Mar. 20, 2008

(30) Foreign Application Priority Data

Sep. 15, 2006 (JP) ............................... 2006-251176

(51) Int. Cl.
*F16H 9/24* (2006.01)
(52) U.S. Cl. ........................ 474/237; 474/206; 474/215; 474/216; 474/229; 474/230; 474/242
(58) Field of Classification Search ................ 474/237, 474/229, 230
See application file for complete search history.

(56) References Cited

U.S. PATENT DOCUMENTS 5,728,021 A * 3/1998 van Rooij et al. ........... 474/229
7,306,532 B2 * 12/2007 van Rooij et al. ........... 474/215
2002/0068654 A1 * 6/2002 Baumann et al. ............ 474/215
2005/0209035 A1 * 9/2005 Oberle et al. ................ 474/206

FOREIGN PATENT DOCUMENTS

| JP | 2006-2784 | 1/2006 |
| JP | 2006-57722 | 3/2006 |
| JP | 2006-214508 | 8/2006 |
| JP | 2006-226405 | 8/2006 |

* cited by examiner

*Primary Examiner*—Robert A Siconolfi
*Assistant Examiner*—San Aung
(74) *Attorney, Agent, or Firm*—Rabin & Berdo, PC

(57) ABSTRACT

A power transmission chain includes a plurality of links aligned in a chain travel direction and a coupling member that includes a first power transmission member and a second power transmission member. The first power transmission member includes an opposing portion that opposes the corresponding second power transmission member and contacts the corresponding second power transmission member on a contact portion that undergoes displacement in association with a change of a bending angle between corresponding links in a contact state including at least one of rolling contact and sliding contact. The opposing portion includes an arc-shaped portion having a predetermined radius of curvature and a rate-of-change increasing portion. The arc-shaped portion includes a portion that forms the contact portion when the bending angle is equal to or greater than zero and equal to or smaller than a predetermined boundary angle.

8 Claims, 10 Drawing Sheets

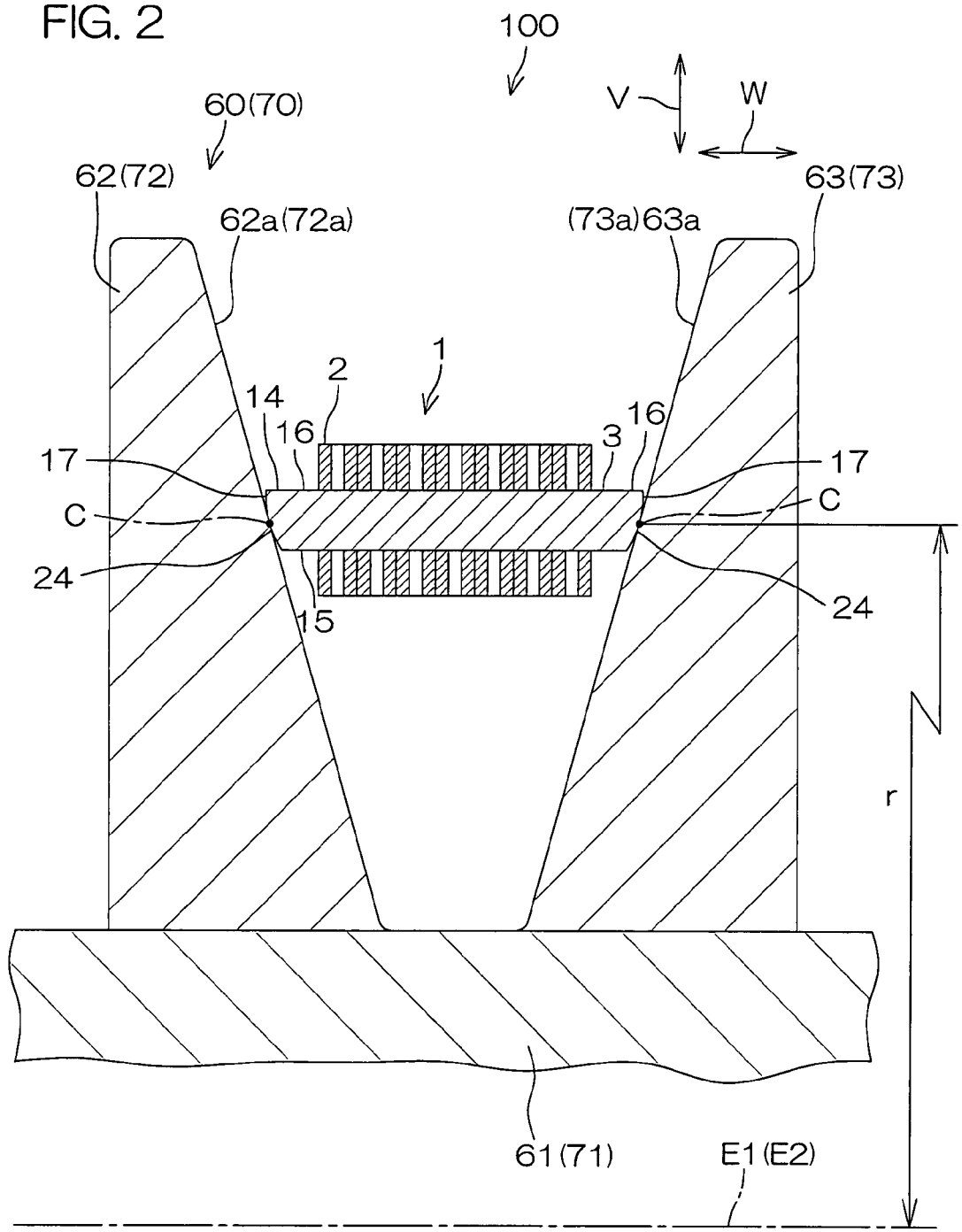

POWER TRANSMISSION CHAIN AND POWER TRANSMISSION DEVICE

BACKGROUND OF THE INVENTION

1. Field of the Invention

The present invention relates to a power transmission chain and a power transmission device.

2. Description of Related Arts

For a power transmission device, such as a pulley type CVT (Continuously Variable Transmission) in an automobile, for example, an endless power transmission chain is used. As a power transmission chain, there is a type formed by coupling links aligned adjacently in the chain travel direction one to another with the use of pins and inter-pieces allowed to undergo a rolling movement with respect to each other (see, for example, References 1, 2, and 3 specified below).

Reference 1: Japanese Unexamined Patent Publication No. 2006-2784

Reference 2: U.S. Pat. No. 5,728,021

Reference 3: Japanese Unexamined Patent Publication No. 2006-226405

In the power transmission chain described above, when adjacent links bend with respect to each other, the side surface of the corresponding pin and the side surface of the corresponding inter-piece come into rolling contact with each other, which causes the contact position of these two members to move. The sectional shape of the side surface of the pin forms an involute curve. This configuration reduces a chordal action of the chain occurring when the chain is meshed with the pulleys.

The starting point of the involute curve described above is the contact portion between the pin and the inter-piece in a linear region of the chain, which is a region over which the chain extends linearly. The involute curve has a small radius of curvature in the vicinity of the starting point. Consequently, of the entire side surface of the pin, the radius of curvature is small in a portion that forms the contact portion in the linear region of the chain, and so is the contact area with the inter-piece.

As a consequence, an allowable transmission load between the pin and the inter-piece becomes smaller, which limits an allowable transmission torque of the chain. In addition, because the pin readily rolls with respect to the inter-piece in the linear region of the chain, under some vehicle running conditions, there may be a case where the linear region of the chain accidentally moves and the behavior of the chain is disturbed.

An object of the invention is to provide a power transmission chain capable of reducing the chordal action and increasing an allowable transmission torque as well as stabilizing the behavior in the linear region, and a power transmission device including the same.

SUMMARY OF THE INVENTION

In order to achieve the above object, in a mode of the present invention, a power transmission chain includes a plurality of links aligned in a chain travel direction and a plurality of coupling members that couple the plurality of links one to another. The coupling member includes a first power transmission member and a second power transmission member. The first power transmission member in the coupling member includes an opposing portion that opposes the corresponding second power transmission member. The opposing portion comes into contact with the corresponding second power transmission member on a contact portion that undergoes displacement in association with a change of a bending angle between corresponding links in a contact state including at least one of rolling contact and sliding contact. When viewed in a chain width direction orthogonal to the chain travel direction, the opposing portion includes an arc-shaped portion having a predetermined radius of curvature and a rate-of-change increasing portion in which a rate of change in amount of displacement of the contact portion increases with an increase of the bending angle. The arc-shaped portion includes a portion that forms the contact portion when the bending angle is equal to or greater than zero and equal to or smaller than a predetermined boundary angle. The rate-of-change increasing portion forms the contact portion when the bending angle is greater than the predetermined boundary angle.

According to the present mode, in a state where the bending angle is zero or close to zero, the shape of the portion forming the contact portion in the opposing portion of the first power transmission member can be formed in the shape of an arc having a large radius of curvature. Accordingly, a surface pressure at the contact portion can be lessened by ensuring a sufficiently large area for the contact portion. It is thus possible to increase an allowable transmission load between the first power transmission member and the second power transmission member, which can in turn increase an allowable transmission torque of the chain. In addition, in a state where the bending angle is zero or close to zero, a large contact area is secured between the first power transmission member and the second power transmission member. The first and second power transmission members are thus allowed to come into surface contact with each other, thereby engaging with each other in a stable manner. It is thus possible to suppress the occurrence of an event that the first power transmission member accidentally starts a rolling movement with respect to the second power transmission member. Hence, the behavior of the power transmission chain can be stabilized in a chain linear region as a region over which the chain extends linearly. Further, when the bending angle becomes greater than the boundary angle, the rate-of-change increasing portion forms the contact portion. It is thus possible to reduce the chordal action of the chain occurring when the chain is meshed with the pulleys or the like.

BRIEF DESCRIPTION OF THE DRAWINGS

FIG. 2 is a partially enlarged section of a drive pulley (driven pulley) and the chain of FIG. 1;

DETAILED DESCRIPTION OF THE PREFERRED EMBODIMENT

A preferred embodiment of the present invention will be described with reference to the accompanying drawings.

Figure 1:
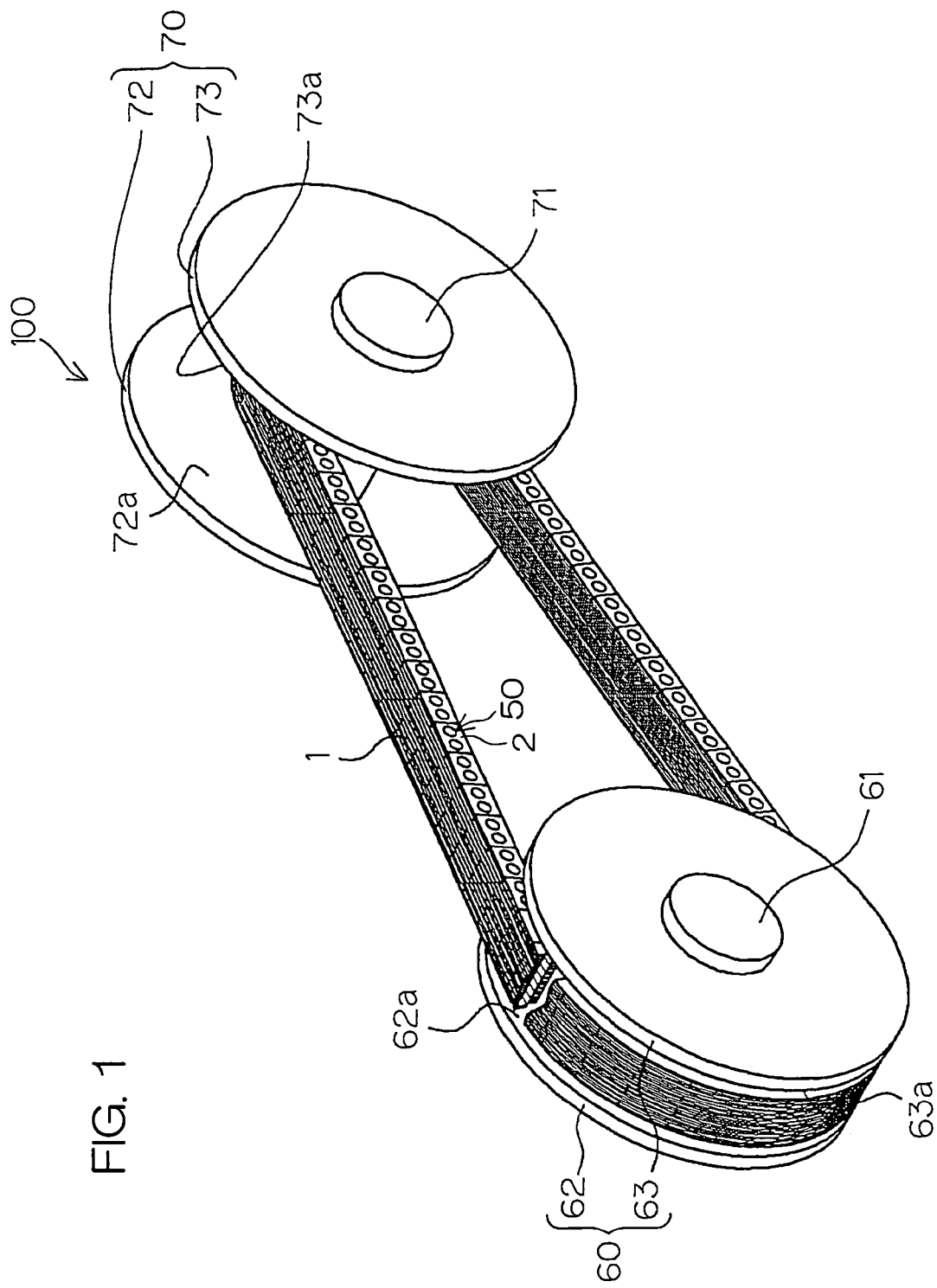
FIG. 1 is a perspective view schematically showing the major configuration of a chain type CVT as a power transmission device including a power transmission chain according to one embodiment of the invention.

FIG. 1 is a perspective view schematically showing the major configuration of a chain type CVT (hereinafter, also referred to simply as the CVT) as a power transmission device including a power transmission chain according to one embodiment of the invention.

Referring to FIG. 1, a CVT 100 is mounted on a vehicle, such as an automobile. The CVT 100 includes a drive pulley 60 made of metal (structural steel or the like) serving as a first pulley, a driven pulley 70 made of metal (structural steel or the like) serving as a second pulley, and an endless power transmission chain 1 (hereinafter, also referred to simply as the chain) wound over these pulleys 60 and 70. For ease of understanding, a section is shown in FIG. 1 for part of the chain 1.

The drive pulley 60 forms one of a pair of pulleys, and the driven pulley 70 forms the other one of the pair of pulleys. Power transmitted to the drive pulley 60 is transmitted to the driven pulley 70 via the chain 1. In the chain 1, a chain bending region as a region wound over either one of the pulleys 60 and 70 and a linear region as a linearly extending region are formed alternately.

FIG. 2 is a partially enlarged section of the drive pulley 60 (driven pulley 70) and the chain 1 of FIG. 1. Referring to FIG. 1 and FIG. 2, the drive pulley 60 is attached, in a co-rotatable manner, to an input shaft 61 linked to the driving source of the vehicle in a manner capable of transmitting power. The drive pulley 60 includes a stationary sheave 62 and a movable sheave 63.

The stationary sheave 62 and the movable sheave 63 have a pair of opposing sheave surfaces 62a and 63a, respectively. Each of the sheave surfaces 62a and 63a includes an inclined plane in the shape of a circular conical surface. A groove is defined in a space between these sheave surfaces 62a and 63a, and the chain 1 is held as it is caught firmly in this groove.

Also, a hydraulic actuator (not shown) to change the groove width is connected to the movable sheave 63. The groove width is changed by moving the movable sheave 63 in the axial direction of the input shaft 61 (lateral direction of FIG. 2) at the time of speed ratio change. The chain 1 is therefore moved in the radial direction of the input shaft 61 (vertical direction of FIG. 2). It is thus possible to change an effective radius r of the drive pulley 60 for the chain 1 (hereinafter, also referred to as the effective radius r of the pulley 60) from a minimum value r1 (see FIG. 3A; for example, 30 mm) to a maximum value r2 (see FIG. 3B; for example, 70 mm).

Meanwhile, as are shown in FIG. 1 and FIG. 2, the driven pulley 70 is attached, in a co-rotatable manner, to an output shaft 71 linked to the drive wheel (not shown) in a manner capable of transmitting power. As with the drive pulley 60, the driven pulley 70 includes a stationary sheave 73 and a movable sheave 72. The stationary sheave 73 and the movable sheave 72 have a pair of opposing sheave surfaces 73a and 72a in the shape of a circular conical surface. A groove to firmly hold the chain 1 is defined by these sheave surfaces 73a and 72a.

As with the movable sheave 63 of the drive pulley 60, a hydraulic actuator (not shown) is connected to the movable sheave 72 of the driven pulley 70. The width of the groove is changed by moving the movable sheave 72 at the time of speed ratio change. Hence, by moving the chain 1, it is possible to change an effective radius r of the pulley 70 for the chain 1 (hereinafter, also referred to as the effective radius r of the pulley 70) from a maximum value r2 (see FIG. 3A) to a minimum value r1 (see FIG. 3B).

Figure 3A:
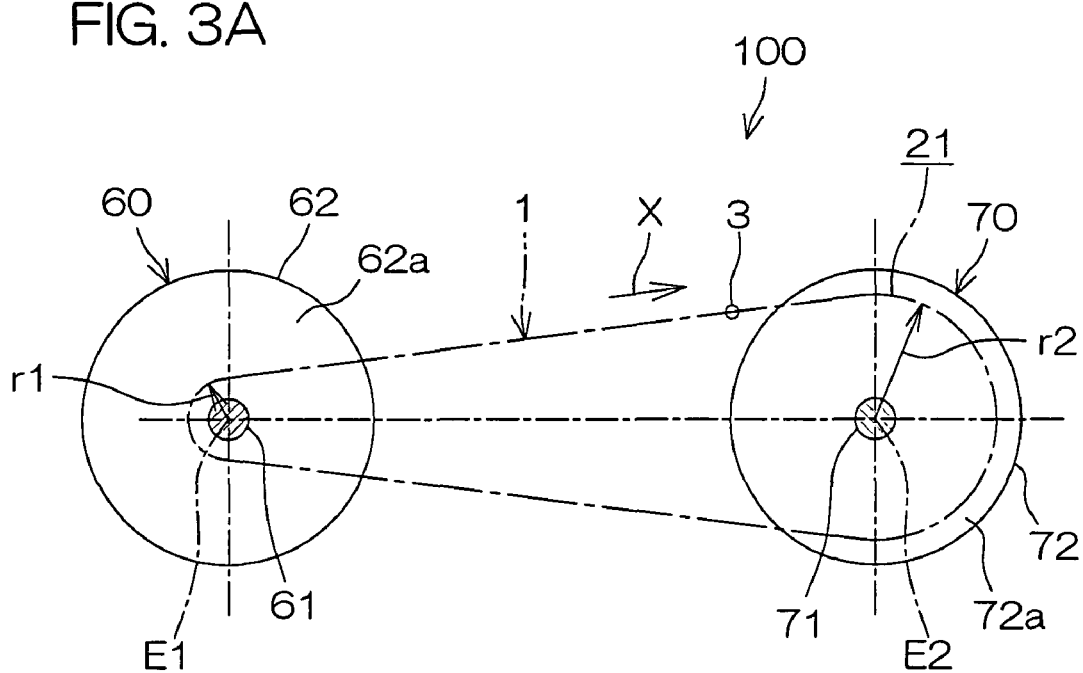
FIG. 3A is a schematic section of the CVT to show a state where the effective radius of the drive pulley is the minimum while the effective radius of the driven pulley is the maximum.

According to this configuration, when the speed reduction ratio of the CVT 100 is the highest (during under drive running), as is shown in FIG. 3A, the effective radius r of the drive pulley 60 is the minimum value r1 while the effective radius r of the driven pulley 70 is the maximum value r2.

Figure 3B:
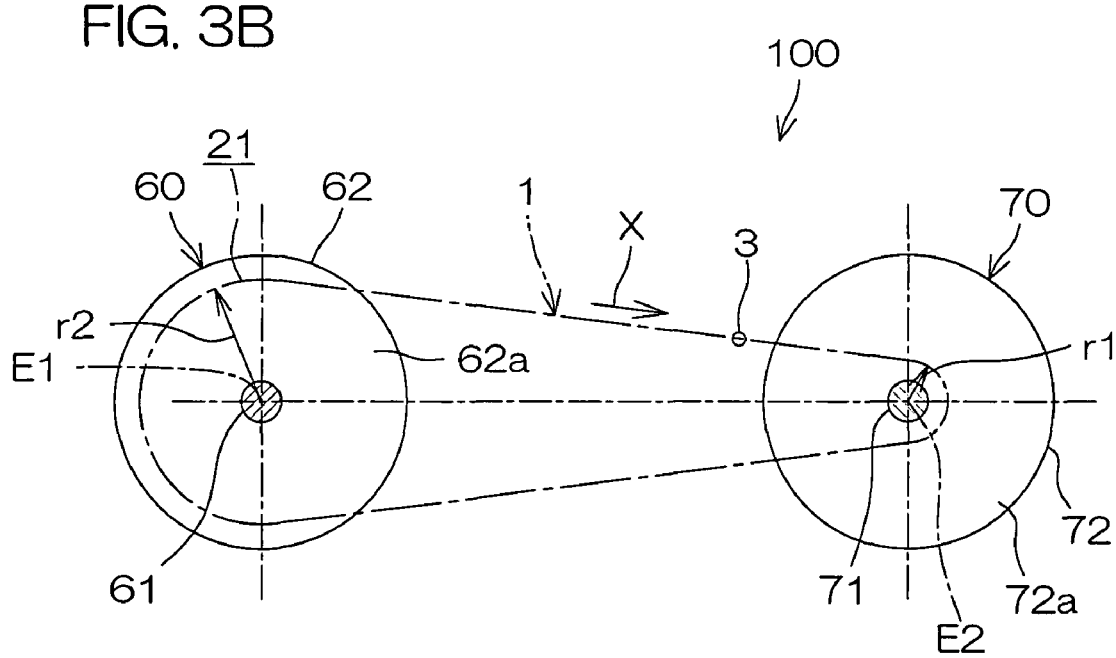
FIG. 3B is a schematic section of the CVT to show a state where the effective radius of the drive pulley is the maximum while the effective radius of the driven pulley is the minimum.

Meanwhile, when speed increasing ratio of the CVT 100 is the highest (during overdrive running), as is shown in FIG. 3B, the effective radius r of the drive pulley 60 is the maximum value r2 while the effective radius r of the driven pulley 70 is the minimum value r1.

Figure 4:
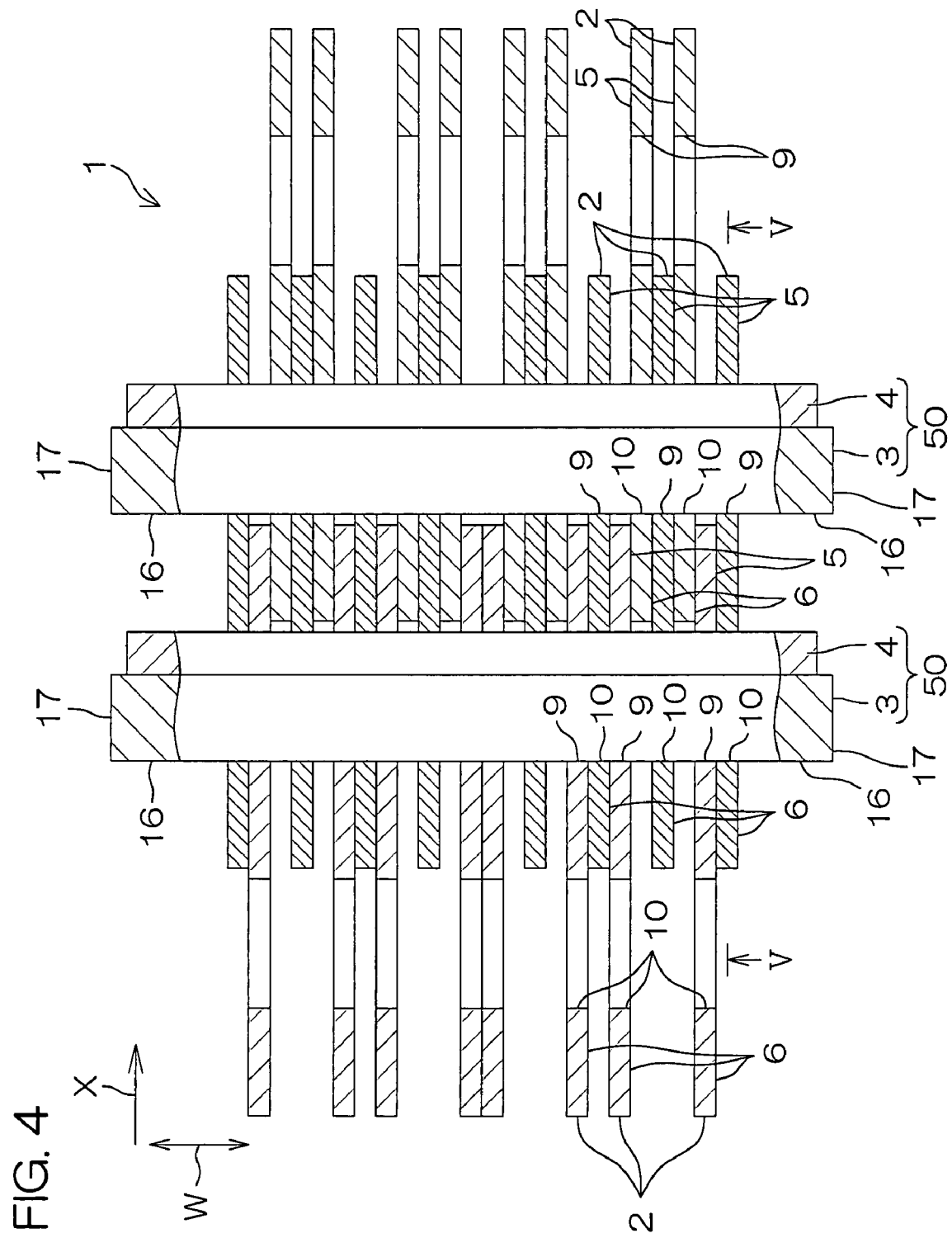
FIG. 4 is a section of the major portion of the chain.
Figure 5:
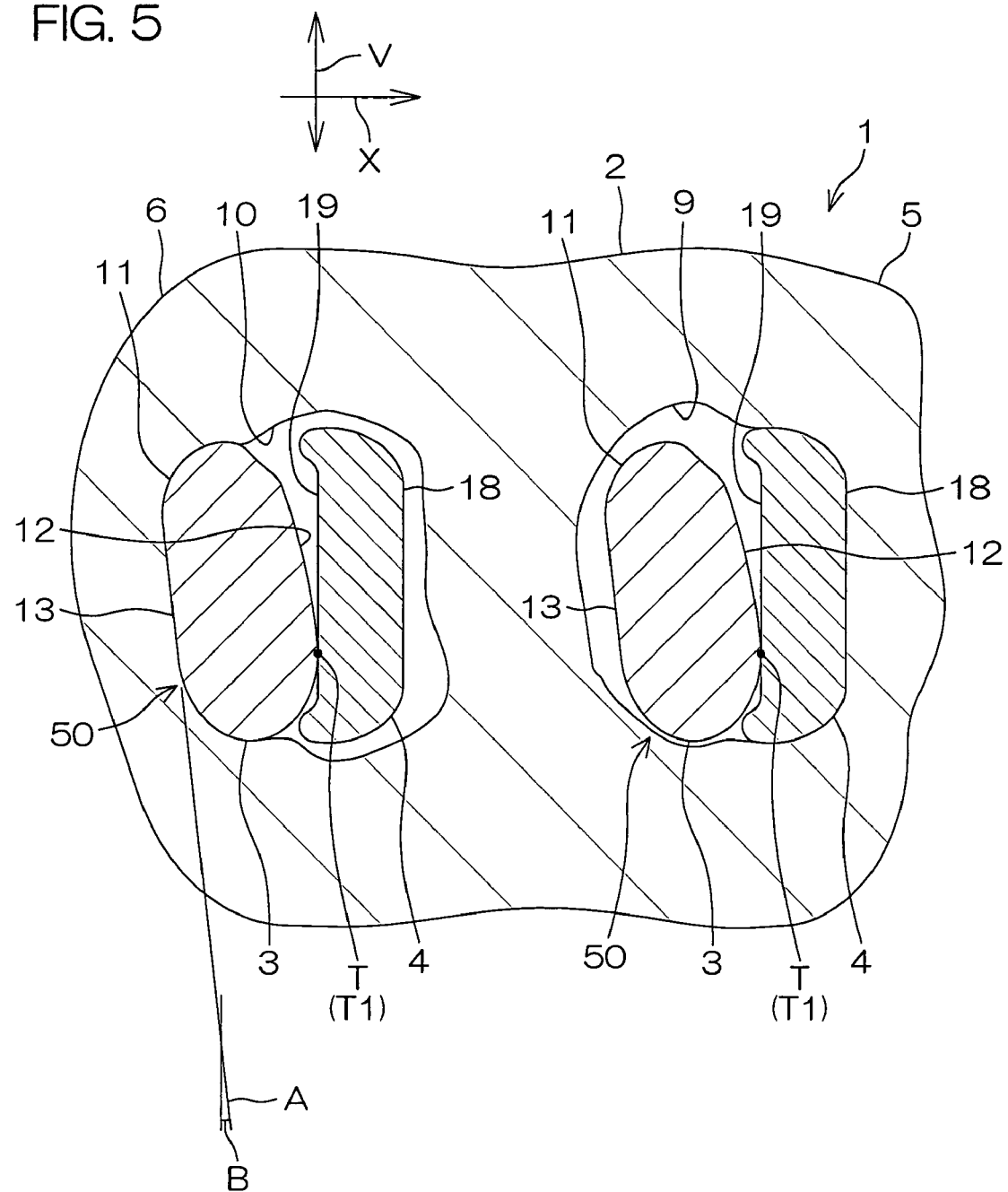
FIG. 5 is a section of the major portion taken along the line V-V of FIG. 4 to show a linear region of the chain.
Figure 6:
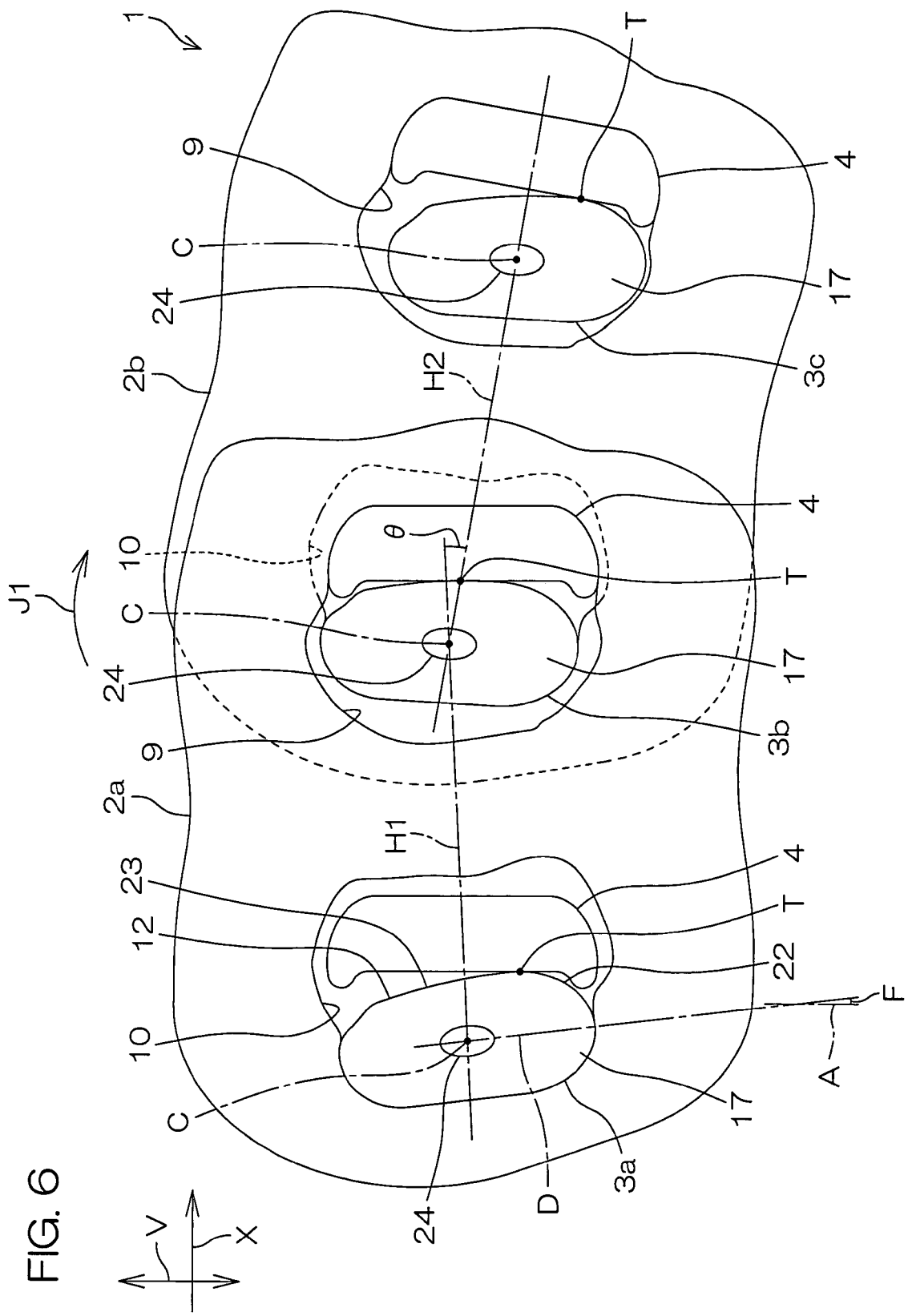
FIG. 6 is a side view of a bending region of the chain when a bending angle is positive.
Figure 7:
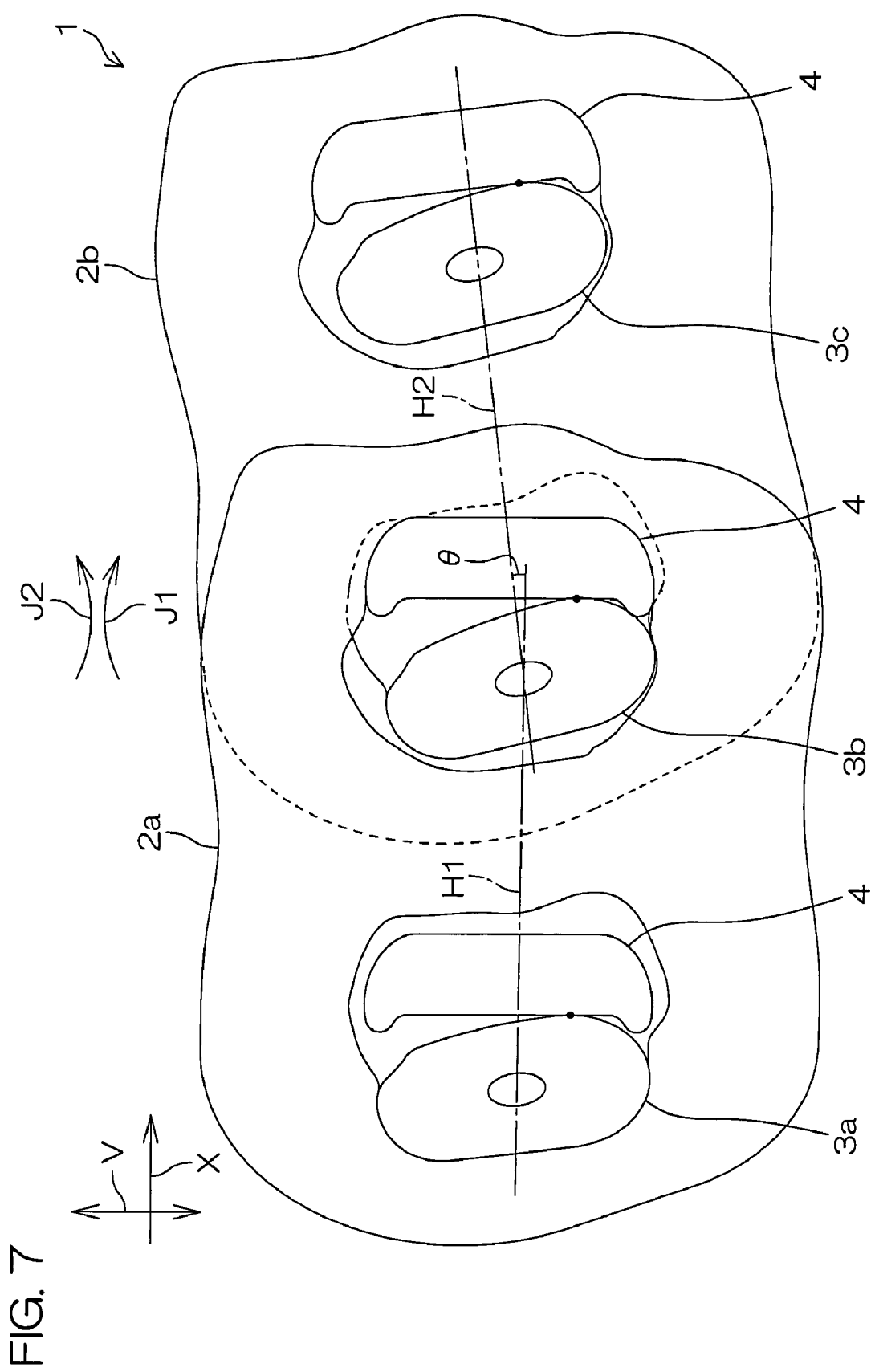
FIG. 7 is a side view of the bending region of the chain when the bending angle is negative.

FIG. 4 is a section of the major portion of the chain 1. FIG. 5 is a section of the major portion taken along the V-V line of FIG. 4 to show the linear region of the chain 1. FIG. 6 is a side view of the bending region of the chain 1 when the bending angle is positive. FIG. 7 is a side view of the bending region of the chain 1 when the bending angle is negative.

Hereinafter, when descriptions are given with reference to FIG. 5, the descriptions are given in reference to the linear region of the chain 1 when viewed in the chain width direction. Also, when descriptions are given with reference to FIG. 6 and FIG. 7, the descriptions are given in reference to the bending region of the chain 1 when viewed in the chain width direction.

Referring to FIG. 4 and FIG. 5, the chain 1 includes a plurality of links 2 aligned in a chain travel direction X and a plurality of coupling members 50 that couple these links 2 one to another.

Hereinafter, a direction parallel to the travel direction of the chain 1 is referred to as the chain travel direction X. Also, of directions orthogonal to the chain travel direction X, a direction parallel to the longitudinal direction of the coupling members 50 is referred to as a chain width direction W. In addition, a direction orthogonal to both the chain travel direction X and the chain width direction W is referred to as an orthogonal direction V. The orthogonal direction V corresponds to the radial direction of the chain 1.

Each link 2 is a plate-like member made of a steel plate. The link 2 includes a front end portion 5 and a rear end portion 6 as a pair of end portions aligned one before the other in the chain travel direction X. A front through-hole 9 as a first through-hole and a rear through-hole 10 as a second through-hole are made in the front end portion 5 and the rear end portion 6, respectively. The links 2 are aligned in the chain travel direction X and also aligned in the chain width direction W, too.

In the links 2 adjacent to each other in the chain travel direction X, the front through-hole 9 in the link 2 situated relatively on the rear in the chain travel direction X and the rear through-hole 10 in the link 2 situated relatively on the front in the chain travel direction X are aligned in the chain width direction W. The links 2 adjacent to each other in the chain travel direction X are coupled to each other with the coupling member 50 inserted through the corresponding through-holes 9 and 10 in such a manner that they are allowed to bend with respect to each other. Thereby the endless chain 1 is formed.

Each coupling member 50 includes a first pin 3 as a first power transmission member and a second pin 4 as a second power transmission member disposed adjacently to the first pin 3. The first and second pins 3 and 4 make a pair. These first and second pins 3 and 4 making a pair come into contact with each other in a contact state including at least one of rolling contact and sliding contact in association with the bending of the corresponding links 2.

The first pin 3 is a member extending in the chain width direction W. A peripheral surface 11 of the first pin 3 extends in parallel with the chain width direction W. The peripheral surface 11 has a front portion 12 as an opposing portion that faces frontward in the chain travel direction X and a rear portion 13 that faces rearward in the chain travel direction X.

The sectional shape of the front portion 12 forms a smooth curve. The front portion 12 comes into contact with the second pin 4, which is the counterpart of the pair, on a contact portion T in a contact state including at least one of rolling contact and sliding contact. The front portion 12 of the first pin 3 can be said as a portion that is allowed to come into contact with the second pin 4 as the counterpart of the pair.

A contact portion T1 in the linear region of the chain 1 is disposed on the inner side in the radial direction of chain in the front portion 12. The rear portion 13 is formed to be a flat surface, and has a predetermined inclination angle B with respect to a predetermined plane A orthogonal to the chain travel direction X.

The first pin 3 is provided with a pair of end portions 16 in the longitudinal direction of the first pin 3 (chain width direction W). The pair of end portions 16 protrudes in the chain width direction W from the links 2 disposed at a pair of the end portions in the chain width direction W. The pair of end portions 16 is provided with end faces 17 as a pair of power transmission portions.

With reference to FIG. 2 and FIG. 6, the end faces 17 making the pair oppose each other in the chain width direction W and have shapes symmetric with respect to each other. These end faces 17 are to come into frictional contact (engage) with the corresponding sheave surfaces 62a and 63a and the sheave surfaces 72a and 73a of the respective pulleys 60 and 70 via lubricant (oil) films.

The first pin 3 is pinched between the corresponding sheave surfaces 62a and 63a and the corresponding sheave surfaces 72a and 73a. Accordingly, power is transmitted between the first pin 3 and the respective pulleys 60 and 70. Because the end faces 17 of the first pin 3 directly contribute to power transmission, the first pin 3 is made of a material having high strength and excellent wear and abrasion resistance. Examples of such a material include bearing steel, such as an SUJ2 material in compliance with the JIS (Japanese Industrial Standard).

Each end face 17 of the first pin 3 is convexly curved outward in the chain width direction W and faces inner side in the radial direction of the chain. Of the end face 17, a contact region 24 comes into contact with the respective pulleys 60 and 70.

When viewed in the chain width direction W, the contact region 24 is, for example, of an elliptical shape and has a contact center point C as the center of figure. When viewed in the chain width direction W, the position of the contact center point C coincides, for example, with the position of the center of figure of the end face 17.

The effective radius r of each of the pulleys 60 and 70 described above is defined as follows. That is, the effective radius r of the drive pulley 60 is defined as a distance in the radial direction of the pulley 60 from the contact center point C of the first pin 3 pinched in the drive pulley 60 to a center axial line E1 of the drive pulley 60.

Likewise, the effective radius r of the driven pulley 70 is defined as a distance in the radial direction of the pulley 70 from the contact center point C of the first pin 3 pinched in the driven pulley 70 to a center axial line E2 of the driven pulley 70.

When viewed in the chain width direction W, a major axis D of the contact region 24 has a predetermined attack angle F (for example, 5 to 12°, and 7.5° in this embodiment) with respect to the plane A described above. The major axis D heading from outer side in radial direction of the chain to the inner side in radial direction of the chain travels toward the chain travel direction X.

The attack angle F is made equal, for example, to the inclination angle B (see FIG. 5) of the rear portion 13 of the first pin 3 (F=B). However, it may be set to be F≠B.

Referring to FIG. 4 and FIG. 5, the second pin 4 (referred to also as the strip or the inter-piece) is a member extending in the chain width direction W and it is made of the same material as the first pin 3.

The second pin 4 is formed shorter than the first pin 3 so as not to come into contact with the sheave surfaces of the respective pulleys. A peripheral surface 18 of the second pin 4 extends in the chain width direction W. The peripheral surface 18 has a rear portion 19 as an opposing portion facing rearward in the chain travel direction X.

The rear portion 19 has a flat surface orthogonal to the chain travel direction X. The rear portion 19 opposes the front portion 12 of the first pin 3 as the counterpart of the pair. The rear portion 19 comes into contact with the front portion 12 as the counterpart of the pair on the contact portion T in a contact state including at least one of rolling contact and sliding contact.

The chain 1 is a so-called press-fit type chain. To be more concrete, in the front through-hole 9 in each link 2, the corresponding first pin 3 is loose-fit so as to enable relative movements whereas the corresponding second pin 4 is press-fit immovably. Also, in the rear through-hole 10 in each link 2, the corresponding first pin 3 is press-fit immovably whereas the corresponding second pin 4 is loose-fit to enable relative movements.

According to the configuration described above, the front portion 12 of the first pin 3 comes into contact with the rear portion 19 of the second pin 4 as the counterpart of the pair on the contact portion T that undergoes displacement in association with the bending of the corresponding links 2 in a contact state including at least one of rolling contact and sliding contact.

Referring to FIG. 6, the links 2 adjacent to each other in the chain travel direction X bend in the bending region of the chain 1 while producing a bending angle θ with respect to each other. The bending angle θ is defined as an angle produced between a first plane H1 and a second plane H2.

The first plane H1 is a plane parallel to the chain width direction W including the contact center points C of the first pins 3a and 3b inserted, respectively, into the through-holes 9 and 10 in one link 2a in the bending region.

The second plane H2 is a plane parallel to the chain width direction W including contact center points C of the first pins 3b and 3c inserted, respectively, into the through-hole 9 and the through-hole 10 in another link 2b adjacent to the link 2a in the chain travel direction X.

As is shown in FIG. 6, when viewed in the chain width direction W, in a state where another link 2b that is adjacent to one link 2a and situated before in the chain travel direction X bends toward inner side in radial direction of the chain with respect to the link 2a, the chain 1 is said that it bends in a regular bending direction J1. In this instance, the bending angle θ takes a positive value. When the bending angle θ is positive, the phrase, "the bending angle θ increases", means that the absolute value of the bending angle θ increases. In the chain 1, a region where the bending angle θ=0° is referred to as the chain linear region.

Meanwhile, referring to FIG. 7, when viewed in the chain width direction W, in a state where another link 2b that is adjacent to one link 2a and situated before in the chain travel direction X bends toward outer side in radial direction of the chain with respect to the link 2a, the chain 1 is said that it bends in a direction J2 opposite to the regular bending direction J1. In this instance, the bending angle θ takes a negative value. When the bending angle θ is negative, the phrase, "the bending angle θ increases", means that the absolute value of the bending angle θ decreases.

The bending angle θ in design is set, for example, to fall within a range of −6° to 18°. It is configured in such a manner that the chain 1 has at least a predetermined bending angle θm (for example, 6° in this embodiment) in the bending region over which it is wound over the respective pulleys.

Referring to FIG. 3A and FIG. 6, to be more concrete, during the underdrive running at which the speed reduction ratio of the CVT 100 is the highest, the bending angle θ in the bending region 21 of the chain 1 engaging with the driven pulley 70 becomes the predetermined bending angle θm.

Likewise, referring to FIG. 3B and FIG. 6, during the overdrive running at which the speed increasing ratio of the CVT 100 is the highest, the bending angle θ in the bending region 21 of the chain 1 engaging with the drive pulley 60 becomes the predetermined bending angle θm.

Figure 8:
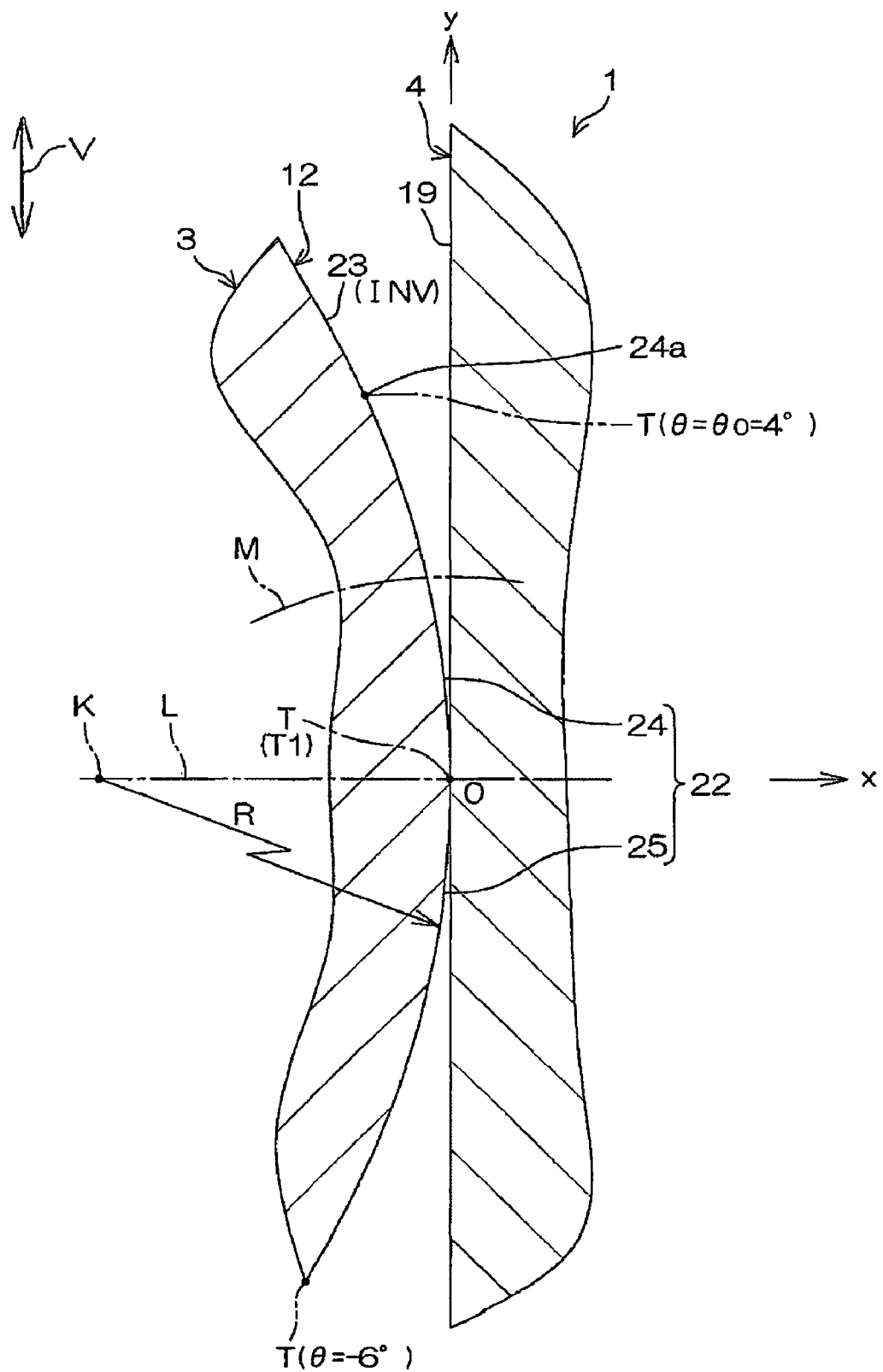
FIG. 8 is a section of the major portion of a first pin and a second pin in the linear region of the chain.

FIG. 8 is a section of the major portion of the first pin 3 and the second pin 4 in the linear region of the chain 1. Referring to FIG. 8, this embodiment is characterized in that when viewed in the chain width direction W, the front portion 12 of the first pin 3 includes an arc-shaped portion 22 having a predetermined radius of curvature R and a rate-of-change increasing portion 23 where a rate of change in amount of displacement of the contact portion T increases with an increase of the bending angle θ between the links 2.

The arc-shaped portion 22 includes an outer side portion 24 in radial direction of the chain and an inner side portion 25 in radial direction of the chain.

The outer side portion 24 in radial direction of the chain is provided as a portion that forms the contact portion T when the bending angle θ is equal to or greater than zero and equal to or smaller than the boundary angle θ0 (0≦θ≦θ0).

The inner side portion 25 in radial direction of the chain is provided as a portion that forms the contact portion T when the bending angle θ takes a negative value (θ<0).

In the rate-of-change increasing portion 23, the contact portion T is formed when the bending angle θ is greater than the predetermined boundary angle θ0 (θ>θ0).

The arc-shaped portion 22 includes a part of a cylindrical surface. When viewed in the chain width direction W, the arc-shaped portion 22 is formed in the shape of an arc having the predetermined radius of curvature R as a single radius of curvature. The radius of curvature R is set to satisfy conditions (i) and (ii) described below.

That is to say, the radius of curvature R is set (i) to a large radius so that when a predetermined tension load is applied to the chain 1 in a drawing step described below, the contact pressure is low enough not to leave a impression on the rear portion 19 by the arc-shaped portion 22 comes into contact with the rear portion 19 of the corresponding second pin 4, and (ii) to a small radius so that an amount of displacement of the contact portion T per unit bending angle (bending angle of 1°) in the arc-shaped portion 22 will not become excessively large.

To be more concrete, the radius of curvature R is set to a range of 2 mm to 5 mm. In this embodiment, the radius of curvature R is set to 3 mm.

When the radius of curvature R is smaller than 2 mm, the contact with the rear portion 19 of the second pin 4 becomes more like line contact, which makes it difficult to secure a sufficiently large contact area. On the contrary, when the radius of curvature R exceeds 5 mm, an amount of displacement of the contact portion T per unit bending angle becomes too large. In view of the foregoing, the radius of curvature R is preferably in the range specified above.

According to the configuration described above, in the arc-shaped portion 22, a rate of change in amount of displacement of the contact portion T in response to a change of the bending angle θ is zero. When viewed in the chain width direction W, the center of curvature K of the arc-shaped portion 22 is positioned on a plane L including the contact portion T1 in the chain linear region and orthogonal to the orthogonal direction V. Accordingly, when viewed in the chain width direction W, the arc-shaped portion 22 has a line symmetric shape about the plane L.

The inner side portion 25 in radial direction of the chain in the arc-shaped portion 22 is disposed on one side in the orthogonal direction V in the arc-shaped portion 22. In this embodiment, the inner side portion 25 in radial direction of the chain forms the contact portion T when the bending angle θ is −6° to 0° (excluding zero).

The outer side portion 24 in radial direction of the chain in the arc-shaped portion 22 is disposed on the other side in the orthogonal direction V in the arc-shaped portion 22, and continues smoothly to the inner side portion 25 in radial direction of the chain without a break. The outer side portion 24 in radial direction of the chain forms the contact portion T when the bending angle θ is 0° to 4° (including zero). In other words, the boundary angle θ0 is 4° in this embodiment.

The boundary angle θ0 is smaller than the predetermined bending angle θm (θ0<θm). In other words, the outer side portion 24 in radial direction of the chain in the arc-shaped portion 22 forms the contact portion T when the bending angle θ is smaller than the predetermined bending angle θm and equal to or smaller than the boundary angle θ0. The reason why is as follows. That is, when the boundary angle θ0 is equal to or greater than the predetermined bending angle θm, there may be a case where the contact portion T is not formed in the rate-of-change increasing portion 23 when the chain 1 is wound over the respective pulleys. As a result, an effect of reducing the chordal action of the chain 1 may not be fully exerted.

The rate-of-change increasing portion 23 is to reduce the chordal action of the chain 1 occurring when the chain 1 is meshed with the respective pulleys. The rate-of-change increasing portion 23 is a curved surface that smoothly continues to one end portion 24a of the outer side portion 24 in radial direction of the chain in the arc-shaped portion 22 without a break. When viewed in the chain width direction W, at least a part of the rate-of-change increasing portion 23 includes an involute curve INV. In this embodiment, the entire region of the rate-of-change increasing portion 23 forms the involute curve INV.

The involute curve INV is based on a base circle M disposed on one side of the orthogonal direction V (on the inner side in radial direction of the chain) with respect to the involute curve INV. The radius of curvature of the involute curve INV is set to be larger than the radius of curvature R of the arc-shaped portion 22 in any portion of the involute curve INV.

Accordingly, an amount of displacement of the contact portion T along the front portion 12 per unit bending angle is relatively small in the arc-shaped portion 22 and relatively large in the rate-of-change increasing portion 23. Also, the radii of curvature of the arc-shaped portion 22 and the rate-of-change increasing portion 23 in the boundary portion therebetween (one end portion 24a in the outer side portion 24 in radial direction of the chain) are set to be generally equal to each other. Accordingly, a trajectory of movements of the contact portion T when the portion forming the contact portion T moves from the arc-shaped portion 22 to the rate-of-change increasing portion 23 can be made continuous and smooth.

Figure 9:
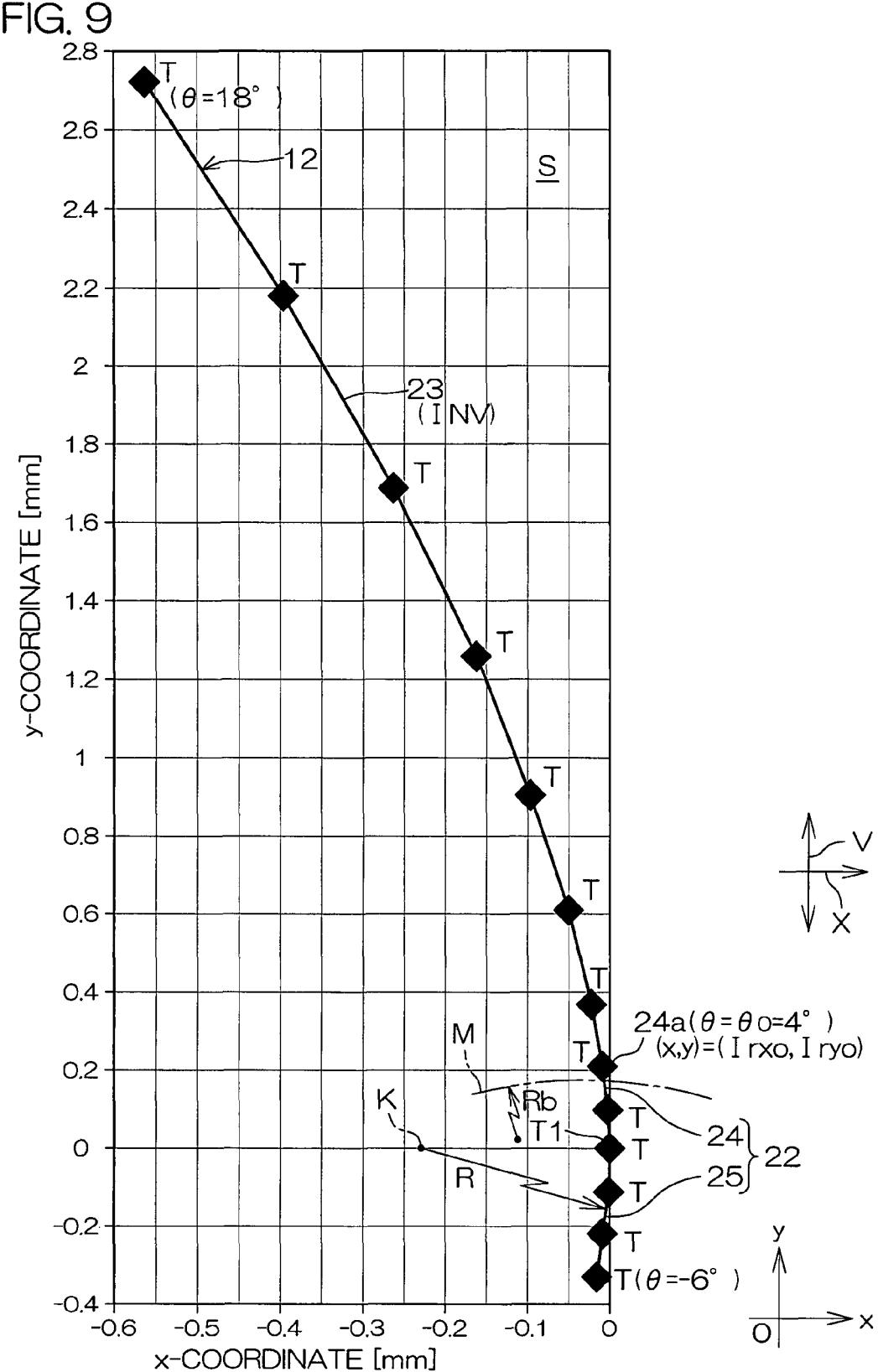
FIG. 9 is a view when a front portion of the first pin is projected onto a projection plane orthogonal to a chain width direction.

FIG. 9 is a view showing the front portion 12 of the first pin 3 projected onto a projection plane S orthogonal to the chain width direction W. A rhombic mark in FIG. 9 indicates the position of a projection point of the contact portion T on the projection plane S at every bending angle of 2°. The front portion 12 is projected onto the projection plane S along the chain width direction W. Hereinafter, the term, "projection", means to be projected along the chain width direction W.

Referring to FIG. 9, in the rate-of-change increasing portion 23, an interval between adjacent rhombic points increases with an increase of the bending angle θ. It is thus understood that a rate of change in amount of displacement of the contact portion T increases with an increase of the bending angle θ.

The projection plane S forms a predetermined projection plane. On the projection plane S, an x-axis extending along the chain travel direction X and a y-axis extending in a direction orthogonal to the x-axis are provided.

On the projection plane S, an origin 0 as the intersection of the x-axis and the y-axis is formed. The origin 0 is formed by projecting the contact portion T1 formed when the bending angle θ is zero onto the projection plane S.

By projecting the contact portion T onto the projection plane S, the projection point of the contact point T is formed on the projection plane S. The coordinates (x, y) of the projection point of the contact portion T on the projection plane S are expressed by following formulas (1) through (4):

when $θ0 \geq θ$, $$x = -\{R - R\cos(πθ/180)\} \quad (1)$$

$$y = R\sin(πθ/180) \quad (2)$$

when $θ0 < θ$, $$x = -Rb\sin(πθ/180) + Rb(πθ/180)\cos(πθ/180) - Ixp0 + Irx0 \quad (3)$$

$$y = Rb\cos(πθ/180) + Rb(πθ/180)\sin(πθ/180) - Rb - Iyp0 + Iry0 \quad (4)$$

where θ0 is the boundary angle (deg), θ is the bending angle (deg), R is the radius of curvature of the arc-shaped portion 22 (mm), Rb is the radius of the base circle M as to a trajectory of the projection point of the contact portion T in the rate-of-change increasing portion 23 (mm), $Irx0 = -\{R - R\cos(πθ0/180)\}$ ... (5), $Iry0 = R\sin(πθ0/180)$ ... (6), $Ixp0 = -Rb\sin(πθ0/180) + Rb(πθ0/180)\cos(πθ0/180)$ ... (7), and $Iyp0 = Rb\cos(πθ0/180) + Rb(πθ0/180)\sin(πθ0/180) - Rb$ ... (8).

In other words, the shape when the front portion 12 of the first pin 3 is projected onto the projection plane S satisfies formulas (1) through (4) above. In this embodiment, the radius Rb of the base circle M is set, for example, to 55 mm.

Formulas (1) and (2) above represent the coordinates of the projection point of the contact portion T when the bending angle θ is equal to or smaller than the boundary angle θ0, that is, when the inequality, the boundary angle $θ0 \geq$ bending angle θ (including negative bending angle θ), is established. In this instance, the trajectory drawn by the projection point of the contact portion T agree with the shape when the arc-shaped portion 22 is projected onto the projection plane S.

The x-coordinate and the y-coordinate (Irx0, Iry0) when the bending angle θ is equal to the boundary angle θ0 (θ=θ0) are found by substituting θ=θ0 into formulas (1) and (2) above, that is, in accordance with formulas (5) and (6) above, respectively.

Formulas (3) and (4) represent the coordinates of the projection point of the contact portion T when the bending angle θ is greater than the boundary angle θ0, that is, when the inequality, the boundary angle θ0<bending angle θ, is established. In this instance, the trajectory drawn by the projection point of the contact portion T agree with the shape when the rate-of-change increasing portion 23 is projected onto the projection plane S.

Figure 10:
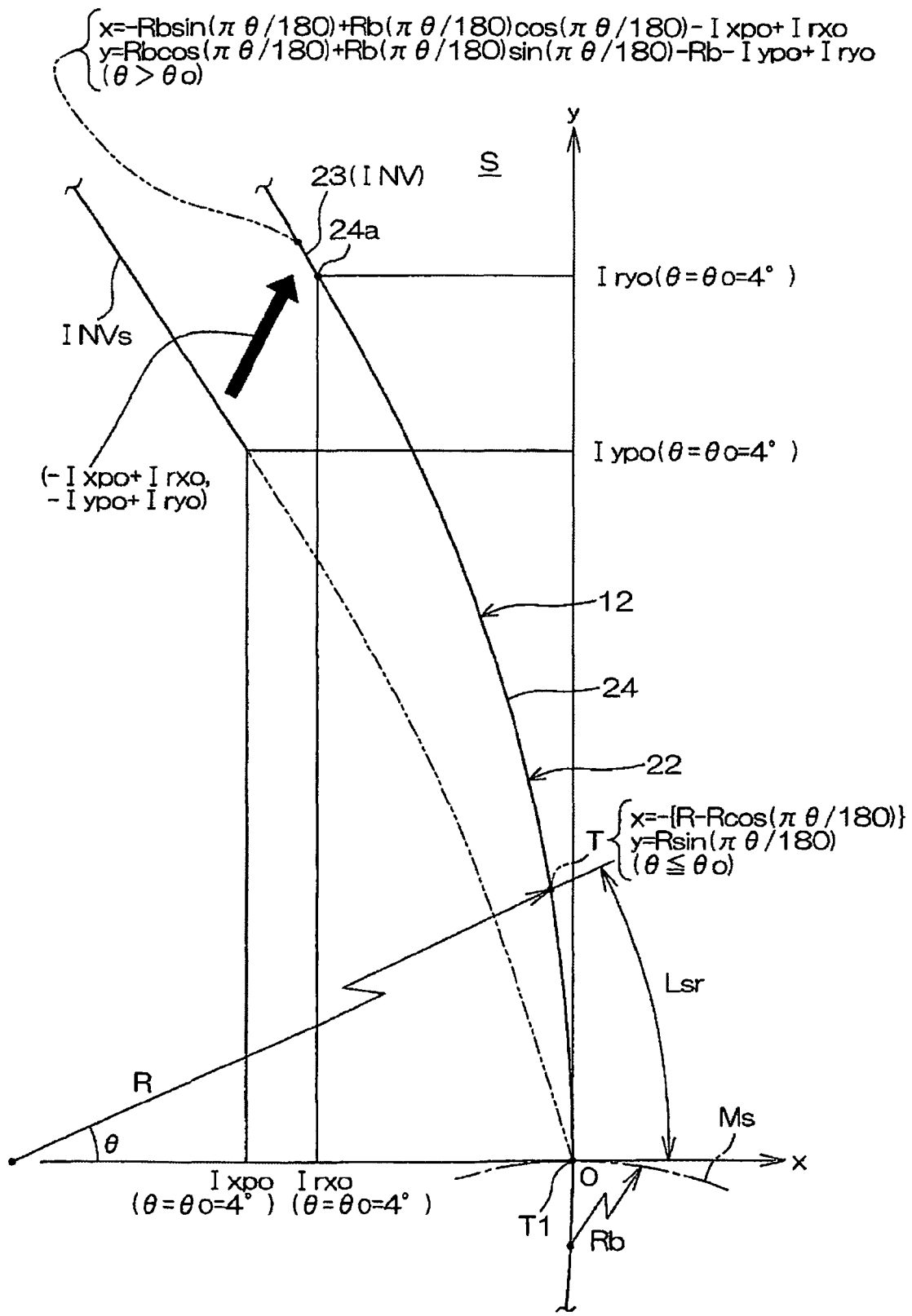
FIG. 10 is a view used to describe an involute curve in a rate-of-change increasing portion.

FIG. 10 is a view used to describe the involute curve INV of the rate-of-change increasing portion 23. Referring to FIG. 10, the projection line of the involute curve INV of the rate-of-change increasing portion 23 on the projection plane S is equivalent to an involute curve obtained by (i) deleting a part (a part indicted by a chain double-dashed line in FIG. 10) on the starting point side of the projection line of a virtual involute curve INVs having the starting point on the origin 0 and (ii) moving the rest part (a part indicated by a solid line in FIG. 10) of the projection line of the involute curve INVs so as to be connected to the projection point of the one end portion 24a of the outer side portion 24 in radial direction of the chain in the arc-shaped portion 22.

The coordinates (Ixp, Iyp) of the projection point of the virtual involute curve INVs are expressed by formulas (9) and (10) below with the use of a known involute function:

$$Ixp = -Rb\sin(πθ/180) + Rb(πθ/180)\cos(πθ/180) \quad (9)$$

$$Iyp = Rb\cos(πθ/180) + Rb(πθ/180)\sin(πθ/180) - Rb \quad (10).$$

The projection line of a base circle Ms as to the virtual involute curve INVs is a circle having the radius Rb. From formulas (9) and (10) above, the coordinates (Ixp0, Iyp0) of each point of the projection line of the virtual involute curve INVs when θ=θ0 is established are expressed by formulas (7) and (8) above, respectively.

As has been described, of the projection line of the virtual involute curve INVs, when only the part (the part indicated by a solid line in FIG. 10) where θ>θ0 is established is moved so as to be connected to the projection point of the one end portion 24a of the outer side portion 24 in radial direction of the chain in the arc-shaped portion 22, then it agrees with the involute curve INV of the rate-of-change increasing portion 23 expressed by formulas (3) and (4) above.

An amount of movement of the projection line of the virtual involute curve INVs needed to bring the projection line of the virtual involute curve INVs into agreement with the projection line of the involute curve INV is found from FIG. 10 to be −Ixp0+Irx0 in the x-direction and −Iyp0+Iry0 in the y-direction.

Hence, the x-coordinate of the projection line of the involute curve INV is expressed by:

$$x = (x\text{-coordinate of the projection line of the virtual}$$
$$\text{involute curve } INVs) - Ixp0 + Irx0$$
$$= Ixp - Ixp0 + Irx0$$
$$= \{-Rb\sin(\Pi\theta/180) + Rb(\Pi\theta/180)\cos(\Pi\theta/180)\} -$$
$$Ixp0 + Irx0,$$

that is, formula (3) above.

Likewise, the y-coordinate of the projection line of the involute curve INV is expressed by:

$$y = (y\text{-corrdinate of the projection line of the virtual}$$
$$\text{involute curve } INVs) - Iyp0 + Iry0$$
$$= Iyp - Iyp0 + Iry0$$
$$= \{Rb\cos(\Pi\theta/180) + Rb(\Pi\theta/180)\sin(\Pi\theta/180) - Rb\} -$$
$$Iyp0 + Iry0,$$

that is, formula (4) above.

As has been described, the involute curve INV matches the shape of the part of the virtual involute curve INVs where $\theta > \theta 0$ is established.

When the arc-shaped portion 22 forms the contact portion T, a distance Lsr (mm) from the origin 0 (contact portion T1) to the projection point of the contact portion T along the projection line of the front portion 12 is expressed by formula (11):

$$Lsr = R(\pi \times |\theta|/180) \qquad (11)$$

A distance Lsr0 from the origin 0 to the projection point of the one end portion 24a of the outer side portion 24 in radial direction of the chain along the projection line of the front portion 12 is expressed by:

$$Lsr0 = R(\pi\theta0/180) \qquad (12)$$

In addition, when the rate-of-change increasing portion 23 forms the contact portion T, a distance Ls (mm) from the origin 0 (contact portion T1) to the projection point of the contact portion T along the projection line of the front portion 12 is expressed by formula (13):

$$Ls = 0.5Rb(\pi\theta/180)^2 - Ls0 + Lsr0 \qquad (13)$$

where $0.5\ Rb(\pi\theta/180)^2$ is a distance from the origin 0 along the projection line of the virtual involute curve INVs, and Ls0 is a distance from the origin 0 along the projection line of the virtual involute curve INVs at the position at which $\theta = \theta 0$ is established and is expressed as $Ls0 = 0.5\ Rb(\pi\theta 0/180)^2$.

The power transmission chain 1 having the schematic configuration described above is formed in an endless form by combining the links 2 and the coupling members 50 as is shown in FIG. 1 and completed after the drawing step.

The drawing step is a step where a pair of jigs (not shown) having a pair of sheave surfaces same as those of the respective pulleys 60 and 70 is prepared and the chain 1 is wound over the pair of jigs, and the chain 1 is pulled at a predetermined load with the use of these jigs.

The predetermined load in this instance is set to be larger than the maximum value in design of the tension load (including the maximum value of a temporary impact load) that the chain 1 undergoes during the use of the CVT 100.

The predetermined load is set, for example, to be about two times as large as the maximum value in design. The chain 1 which has undergone the drawing step is in a state where the respective members, such as the links 2 and the coupling members 50, fit together. Also, it is brought in a state where the strength is increased by subjecting the links 2 to work hardening.

According to this embodiment, it is possible to achieve the functions and effects as follows. That is to say, in a state where the bending angle $\theta$ is zero or close to zero, the shape of the arc-shaped portion 22 forming the contact portion T in the first pin 3 can be formed in the shape of an arc having a large radius of curvature R. It is thus possible to lessen the contact pressure at the contact portion T by securing a sufficiently large area for the contact portion T. Accordingly, an allowable transmission load between the first pin 3 and the second pin 4 can be increased, which can in turn increase an allowable transmission torque of the chain 1.

In addition, because a higher load can be applied in the drawing step, the hardness of the links 2 can be increased to enhance the durability. Further, because the amplitude of stress induced in the first pin 3 at the contact portion T can be lessened, it is possible to enhance the durability by reducing fatigue. In particular, for the press-fit type chain 1, the stress value tends to increase as the first and second pins 3 and 4 are press fit into the links 2. Hence, this fatigue reducing effect contributes markedly to the enhancement of durability.

Further, a large contact area between the first and second pins 3 and 4 can be secured in a state where the bending angle $\theta$ is zero or close to zero. The first and second pins 3 and 4 therefore come into surface contact with each other, thereby engaging with each other in a stable manner. It is thus possible to reduce the occurrence of an event that the first pin 3 undesirably starts a rolling movement with respect to the second pin 4. As a result, the behavior of the chain 1 in the chain linear region can be stabilized.

Furthermore, when the bending angle $\theta$ becomes greater than the boundary angle $\theta 0$, the rate-of-change increasing portion 23 forms the contact portion T. Accordingly, it is possible to reduce the chordal action of the chain 1 occurring when the chain 1 is meshed with the respective pulleys 60 and 70.

Meanwhile, when the bending angle $\theta$ is negative, the inner side portion 25 in radial direction of the chain in the arc-shaped portion 22 forms the contact portion T. Hence, even when the chain 1 bends with great momentum to the extent that the bending angle $\theta$ becomes negative at the transition from the bending region to the linear region, as with the case where the bending angle $\theta$ is positive, the arc-shaped portion 22 is able to form the contact portion T.

Accordingly, when the chain 1 bends while the bending angle $\theta$ becomes positive and negative alternately, it is still possible to make the trajectory of the movements of the contact portion T continuous and smooth, which can in turn further stabilize the behavior of the chain 1.

Further, the rate-of-change increasing portion 23 is formed with the use of the involute curve INV. The rate-of-change increasing portion 23 can be therefore formed in a simple shape. This configuration is also suitable to reduce the chordal action of the chain 1 occurring when the chain 1 is meshed with the respective pulleys 60 and 70.

Also, it is configured in such a manner that the chain 1 is wound over the respective pulleys 60 and 70 while producing at least the predetermined bending angle $\theta$m, and the boundary angle $\theta 0$ is set to be smaller than the predetermined bending angle $\theta$m. Hence, when the chain 1 is meshed with the respective pulleys 60 and 70, the rate-of-change increasing portion 23 is able to form the contact portion T, which makes it possible to reduce the chordal action of the chain 1 in a reliable manner.

Further, the front portion 12 of the first pin 3 is formed in such a manner that the coordinates of the projection point of the contact portion T when the contact portion T is projected onto the projection plan S satisfy formulas (1) through (4) above. Consequently, when the bending angle θ is equal to or smaller than the boundary angle θ0 (θ0≧θ), the arc-shaped portion 22 having the radius of curvature R forms the contact portion T. In addition, when the bending angle θ is greater than the boundary angle θ0 (θ0<θ), the rate-of-change increasing portion 23 formed with the use of the involute curve INV forms the contact portion T.

Further, the sectional shape of the arc-shaped portion 22 includes a symmetric shape about the plane L that includes the contact portion T1 in the chain linear portion and is orthogonal to the orthogonal direction V. Accordingly, in a case where the arc-shaped portion 22 forms the contact portion T, it is possible to make the relative motions of the first and second pins 3 and 4 at the transition from a state where the bending angle θ is zero to a state where it becomes positive and the relative motions of the first and second pins 3 and 4 at the transition from a state where the bending angle θ is zero to a state where it becomes negative identical with each other. It is thus possible to further stabilize the behavior of the chain 1 when the bending angle θ is close to zero.

Further, in the front through-hole 9 in each link 2, the first pin 3 is loose-fit and the second pin 4 is press-fit immovably, while in the rear through-hole 10 in each link 2, the first pin 3 is press-fit immovably and the second pin 4 is loose-fit.

Accordingly, when each end face 17 of each first pin 3 comes into contact with the corresponding sheave surface 62a and 63a, 72a and 73a of the respective pulleys 60 and 70, the second pin 4 as the counterpart of the pair comes into contact with the first pin 3 in a contact state including at least one of rolling contact and sliding contact, which allows the links 2 to bend with respect to each other.

In this instance, rolling contact components account for a major portion and the sliding contact components are extremely small between the first and second pins 3 and 4 making a pair. Consequently, each end face 17 of each first pin 3 is allowed to come into contact with the corresponding sheave surface 62a, 63a, 72a, or 73a while it hardly rotates. It is thus possible to ensure high transmission efficiency by lessening a frictional loss.

As has been described, it is possible to achieve the CVT 100 that vibrates less and excels in silence, durability, and transmission efficiency as well as achieves a large allowable transmission torque.

When the CVT 100 is in a state close to the overdrive or underdrive running state, the bending angle θ is relatively small in the bending region 21 of the chain 1 that engages with the pulley having the larger effective radius r for the chain 1. Hence, chain 1 is meshed into the corresponding pulley 60 or 70 while the contact portion T is formed in the rate-of-change increasing portion 23 at a site closer to the arc-shaped portion 22.

In this case, the effect of reducing the chordal action of the chain 1 by the rate-of-change increasing portion 23 is so small that the first pins 3 collide with the corresponding pulley 60 or 70 at a relatively high speed when the chain 1 is meshed with the pulley 60 or 70. However, because a larger number of the first pins 3 engage with the pulley having the larger effective radius r for the chain 1, the load per first pin 3 is smaller. Hence, even when the first pin 3 collides with the corresponding pulley 60 or 70, it is a collision having a small impact, and the resulting vibrations and noises are so minor that they pose no problem in use.

It should be appreciated that the invention is not limited to the contents of the embodiment above, and various modifications are possible within the scope of the appended claims. For example, the shape of the rate-of-change increasing portion 23 when viewed in the chain width direction W does not necessarily include the involute curve, and it may be of a shape made by combining plural arcs each having a different radius of curvature. In short, it is sufficient to configure in such a manner that the radius of curvature of the front portion 12 of the first pin 3 in the portion forming the contact portion T becomes larger with an increase of the bending angle θ.

Also, the first pins 3 may be loose-fit in the rear through-holes 10 in the respective pins 2. Further, the second pins 4 may be loose-fit in the front through-holes 9 in the respective links 2. Furthermore, the second pins 4 may engage with the respective pulleys 60 and 70.

Moreover, the invention may be applied to a so-called block type power transmission chain in which members having power transmission portions same as the end faces of the first pin are disposed in close proximity to the pair of the end portions of the first pin.

In addition, the invention is not limited to the configuration in which the groove widths of both the drive pulley 60 and the driven pulley 70 are changed. It may be configured in such a manner that the groove width is changed for either one of the pulleys and the groove is fixed to the constant width for the other pulley. Further, the configuration to change the groove widths continuously (in a stepless manner) has been described above. However, the invention is also applicable to other power transmission devices configured in such a manner that the groove width is changed step by step or fixed (no speed ratio change).

While the embodiments of the invention have been described in detail, modifications, alternations and equivalents thereof readily occur to those skilled in the art who understand the contents described above. The invention is therefore includes the scope of the appended claims and the equivalents thereof.

This application corresponds to the Japanese Patent Application No. 2006-251176 filed with the Japanese Patent Office on Sep. 15, 2006, the entire disclosure of which are incorporated herein by reference.

What is claimed is:

1. A power transmission chain, comprising:
   a plurality of links aligned in a chain travel direction; and
   a plurality of coupling members that couple the plurality of links one to another, the coupling members each including a first power transmission member and a second power transmission member, the first power transmission member including an opposing portion that opposes the corresponding second power transmission member, the opposing portion coming into contact with the corresponding second power transmission member on a contact portion undergoing displacement in association with a change of a bending angle between corresponding links in a contact state including at least one of rolling contact and sliding contact, wherein
   when viewed in a chain width direction orthogonal to the chain travel direction, the opposing portion includes an arc-shaped portion having a predetermined radius of curvature and a rate-of-change increasing portion in which a rate of change in amount of displacement of the contact portion increases with an increase of the bending angle, the arc-shaped portion includes a portion that forms the contact portion when the bending angle is equal to or greater than zero and equal to or smaller than a predetermined boundary angle during displacement in a first rotational direction, the rate-of-change increasing portion forms the contact portion when the bending angle is greater than the predetermined boundary angle during displacement in a second rotational direction opposite to the first rotational direction, the power transmission chain is wound over a pulley while producing at least the bending angle, and the boundary angle is smaller than the bending angle.

2. The power transmission chain according to claim 1, wherein when the power transmission chain is bent in a direction opposite to a regular bending direction, the bending angle becomes negative, and the arc-shaped portion includes a portion that forms the contact portion when the bending angle is negative.

3. The power transmission chain according to claim 1, wherein the rate-of-change increasing portion includes an involute curve.

4. The power transmission chain according to claim 1, wherein by projecting the contact portion along the chain width direction onto a predetermined projection plane, a projection point of the contact portion is formed on the predetermined projection plane, the predetermined projection plane is orthogonal to the chain width direction, an x-axis extending in the chain travel direction and a y-axis extending in a direction orthogonal to the x-axis are provided on the predetermined projection plane, by projecting a contact portion formed when the bending angle is zero along the chain width direction onto the predetermined projection plane, an origin as an intersection of the x-axis and the y-axis is formed on the predetermined projection plane, and coordinates (x, y) of the projection point of the contact portion are expressed by following formulas:

when $\theta 0 \geq \theta$, $x = -\{R - R \cos(\pi\theta/180)\}$ $y = R \sin(\pi\theta/180)$ when $\theta 0 < \theta$, $x = -Rb \sin(\pi\theta/180) + Rb(\pi\theta/180)\cos(\pi\theta/180) - Ixp0 + Irx0$ $y = Rb \cos(\pi\theta/180) + Rb(\pi\theta/180)\sin(\pi\theta/180) - Rb - Iyp0 + Iry0$ where $\theta 0$ is the boundary angle (deg), $\theta$ is the bending angle (deg), $R$ is the predetermined radius of curvature of the arc-shaped portion (mm), Rb is a radius of a base circle as to a trajectory of the projection point of the contact portion in the rate-of-change increasing portion (mm), Irx0 and Iry0 are coordinates at which the boundary angle is equal to the bending angle, Ixp0 and Iyp0 are points satisfying an involute curve, and $Irx0 = -\{R - R \cos(\pi\theta0/180)\}$, $Iry0 = -R \sin(\pi\theta0/180)$, $Ixp0 = -Rb \sin(\pi\theta0/180) + Rb(\pi\theta0/180)\cos(\pi\theta0/180)$, and $Iyp0 = Rb \cos(\pi\theta0/180) + Rb(\pi\theta0/180)\sin(\pi\theta0/180) - Rb$.

5. A power transmission device, comprising:
a pair of pulleys each having a pair of opposing sheave surfaces in a shape of a circular conical surface; and
a power transmission chain wound over the pair of pulleys to transmit power between the pair of pulleys, the power transmission chain including a plurality of links aligned in a chain travel direction and a plurality of coupling members that couple the plurality of links one to another, the coupling members each including a first power transmission member and a second power transmission member, the first power transmission member including an opposing portion that opposes the corresponding second power transmission member, the opposing portion coming into contact with the corresponding second power transmission member on a contact portion undergoing displacement in association with a change of a bending angle between corresponding links in a contact state including at least one of rolling contact and sliding contact, wherein when viewed in a chain width direction orthogonal to the chain travel direction, the opposing portion includes an arc-shaped portion having a predetermined radius of curvature and a rate-of-change increasing portion in which a rate of change in amount of displacement of the contact portion increases with an increase of the bending angle, the arc-shaped portion includes a portion that forms the contact portion when the bending angle is equal to or greater than zero and equal to or smaller than a predetermined boundary angle during displacement in a first rotational direction, the rate-of-change increasing portion forms the contact portion when the bending angle is greater than the predetermined boundary angle, the power transmission chain is wound over a pulley while producing at least the bending angle during displacement in a second rotational direction opposite to the first rotational direction, and the boundary angle is smaller than the bending angle.

6. The power transmission device according to claim 5, wherein when the power transmission chain is bent in a direction opposite to a regular bending direction, the bending angle becomes negative, and the arc-shaped portion includes a portion that forms the contact portion when the bending angle is negative.

7. The power transmission device according to claim 5, wherein the rate-of-change increasing portion includes an involute curve.

8. The power transmission device according to claim 5, wherein by projecting the contact portion along the chain width direction onto a predetermined projection plane, a projection point of the contact portion is formed on the predetermined projection plane, the predetermined projection plane is orthogonal to the chain width direction, an x-axis extending in the chain travel direction and a y-axis extending in a direction orthogonal to the x-axis are provided on the predetermined projection plane, by projecting a contact portion formed when the bending angle is zero along the chain width direction onto the predetermined projection plane, an origin as an intersection of the x-axis and the y-axis is formed on the predetermined projection plane, and coordinates (x, y) of the projection point of the contact portion are expressed by following formulas:

when $\theta 0 \geqq \theta$, $$x = -\{R - R\cos(\pi\theta/180)\} \qquad 5$$

$$y = R\sin(\pi\theta/180)$$

when $\theta 0 < \theta$, $$x = -Rb\sin(\pi\theta/180) + Rb(\pi\theta/180)\cos(\pi\theta/180) - Ixp0 + Irx0 \qquad 10$$

$$y = Rb\cos(\pi\theta/180) + Rb(\pi\theta/180)\sin(\pi\theta/180) - Rb - Iyp0 + Iry0$$

where $\theta 0$ is the boundary angle (deg), $\theta$ is the bending angle (deg), R is the predetermined radius of curvature of the arc-shaped portion (mm), Rb is a radius of a base circle as to a trajectory of the projection point of the contact portion in the rate-of-change increasing portion (mm), Irx0 and Iry0 are coordinates at which the boundary angle is equal to the bending angle, IxpO and IypO are points satisfying an involute curve, and $$Irx0 = -\{R - R\cos(\pi\theta 0/180)\},\ Iry0 = -R\sin(\pi\theta 0/180),$$
$$Ixp0 = -Rb\sin(\pi\theta 0/180) + Rb(\pi\theta 0/180)\cos(\pi\theta 0/180),\ \text{and}\ Iyp0 = Rb\cos(\pi\theta 0/180) + Rb(\pi\theta 0/180)\sin(\pi\theta 0/180) - Rb.$$

* * * * *